(12) United States Patent
Grisenthwaite

(10) Patent No.: US 6,892,257 B2
(45) Date of Patent: May 10, 2005

(54) EXCLUSIVE ACCESS CONTROL TO A PROCESSING RESOURCE

(75) Inventor: Richard Roy Grisenthwaite, Cambridgeshire (GB)

(73) Assignee: Arm Limited, Cambridge (GB)

( * ) Notice: Subject to any disclaimer, the term of this patent is extended or adjusted under 35 U.S.C. 154(b) by 460 days.

(21) Appl. No.: 10/002,186

(22) Filed: Dec. 5, 2001

(65) Prior Publication Data

US 2002/0073259 A1 Jun. 13, 2002

(30) Foreign Application Priority Data

Dec. 12, 2000 (GB) .............................................. 0030260

(51) Int. Cl.$^7$ .............................................. G06F 12/00
(52) U.S. Cl. ..................................... 710/200; 711/152
(58) Field of Search ............................... 711/117, 118, 711/124, 128, 138, 139, 141, 143, 144, 146, 147, 152; 710/200

(56) References Cited

U.S. PATENT DOCUMENTS 5,136,691 A * 8/1992 Baror ........................ 711/139
6,446,149 B1 * 9/2002 Moriarty et al. ............ 710/110
6,529,933 B1 * 3/2003 Montgomery et al. ...... 718/102

FOREIGN PATENT DOCUMENTS

| EP | 0 540 161 | 5/1993 |
| EP | 0 898 227 | 2/1999 |
| EP | 0 953 903 | 11/1999 |
| GB | 2 254 457 | 10/1992 |

* cited by examiner

*Primary Examiner*—Khanh Dang
*Assistant Examiner*—Clifford Knoll
(74) *Attorney, Agent, or Firm*—Nixon & Vanderhye P.C.

(57) ABSTRACT

A data processing system is provided with multiple processors that share a main memory. Semaphore values associated with data elements within the memory system, including the main memory, are used to establish exclusive access permissions to those data elements. An exclusive access clear instruction is provided that serves to clear any partially completed exclusive access requests for a processor between the reading of a semaphore value and the writing of a semaphore value to establish the exclusive access permission.

15 Claims, 5 Drawing Sheets

Try again

LDREX Rd, [Rm]

CMP Rd, #Z

BNE [Try again]

⋮

{ Set up desired new semaphore value in Rd }

⋮

STREX Rd, Rn, [Rm]

CMP Rn, #O

BNE [Try again]

⋮

Time window for competing access

EXCLUSIVE ACCESS CONTROL TO A PROCESSING RESOURCE

BACKGROUND OF THE INVENTION

This invention relates to data processing systems. More particularly, this invention relates to data processing systems having control mechanisms for regulating exclusive access to processing resources.

It is known within data processing systems to provide processing resources, such as data elements within a database, that may be shared between different processors or processes. As an example, an airline reservation database system may have a central database storing information regarding the current booking status of an aircraft. This central database may be accessed from many different computers independently and may also be accessed by different processes running on a single computer. In order to ensure the integrity of the data concerned, exclusive access control mechanisms are used whereby exclusive access to a certain portion of the database is given to a particular processor or process at any one time to ensure that different copies of the same data do not come into existence causing data integrity problems.

It is known to use semaphore values associated with a processing resource to indicate whether exclusive access to that processing resource is available to an access requestor. More particularly, a read instruction may read a semaphore value for the purpose of determining whether or not exclusive access may be granted. If the semaphore value indicates that exclusive access would be available, then another instruction is executed to modify the semaphore value to indicate that exclusive access has been given to the access requestor.

Whilst such an arrangement can regulate the access to processing resources, real life systems also need to be able to accommodate such a mechanism within a system that may be subject to the occurrence of interrupts, exceptions or context switches, for example, that may intervene between a semaphore value being read to determine if exclusive access is available and the semaphore value being written to indicate that exclusive access has been allowed. The need to allow for such occurrences whilst not unduly impacting the latency of the system presents a technical problem.

SUMMARY OF THE INVENTION

Viewed from one aspect the present invention provides a method of processing data, said method comprising the steps of:

(i) retrieving a semaphore value corresponding to a processing resource from a semaphore value store;

(ii) storing semaphore identifying data indicative of which semaphore value has been retrieved;

(iii) determining from said semaphore value whether or not said processing resource is available for exclusive access by a requesting exclusive access requestor; and (iv) writing a new semaphore value to said semaphore value store, said new semaphore value being indicative of exclusive access being granted to said exclusive access requestor; wherein (v) in response to execution of an exclusive access clear instruction by an exclusive access requestor clearing stored semaphore identifying data for said exclusive access requestor.

The invention provides an exclusive access clear instruction that serves to clear any semaphore identifying data that has been stored between retrieving a semaphore value and writing a new semaphore value such that a fresh start to establishing an exclusive access permission to a processing resource may later be forced to occur thereby avoiding problems due to intervening processing. As a particular example, should an interrupt, exception, or context switch occur, then an exclusive access clear instruction may be executed by the operating system so as to flush out any pending requests for exclusive access that have not yet been granted and properly locked in place thereby avoiding improper operation.

In order to accommodate multiple exclusive access requests from different sources, the step of writing a new semaphore value returns a result value indicative of whether or not that new semaphore value was written. The result value allows a determination to be made as to whether or not some other processor or process has been granted exclusive access to the processing resource before the step of writing for the current access requestor was able to establish the exclusive access for that access requestor.

The semaphore identifying data could be used in a variety of ways to control the establishing of exclusive access permissions, but a particularly efficient way of providing safe control is to arrange for the step of writing the new semaphore value to check the semaphore identifying data to determine whether or not it has been cleared between the step of storing and the step of writing.

In the case that an interrupt, exception, context switch or some other event had occurred between the storing and the subsequent write attempt, then an exclusive access clear instruction will have been executed to clear the semaphore identifying data and accordingly the write attempt will not succeed and an inappropriate exclusive access permission not granted. Avoiding an inappropriate write may also save bus resources within a system having a shared bus via which the write action must be performed, e.g. if the write action will use the main memory, which is typically on a shared bus, the stopping this write saves bus resources. Freeing the shared bus for use by other parts of the system increases the overall efficiency of the system.

It will be appreciated that the exclusive access requestors could be different processors within a multiprocessor system, or different tasks/processes within a multitasking/multiprocessing system.

The semaphore identifying data may be stored locally to the exclusive access requestor, local to the shared processing resource, or in both places. Storing the semaphore identifying data locally increases the speed with which this may be accessed and reduces the amount of resources that need to be provided to give non-local access to an exclusive access requestor.

It will be appreciated that the processing resource could take a variety of different forms. For example, the processing resource could be an input/output port. A high level memory device or the like. However, the invention is particularly useful in the control of exclusive access to data elements within a data memory.

Viewed from another aspect the invention provides an apparatus for processing data, said apparatus comprising:

(i) retrieving logic operable to retrieve a semaphore value corresponding to a processing resource from a semaphore value store;

(ii) storing logic operable to store semaphore identifying data indicative of which semaphore value has been retrieved;

(iii) determining logic operable to determine from said semaphore value whether or not said processing resource is available for exclusive access by a requesting exclusive access requestor; and (iv) writing logic operable to write a new semaphore value to said semaphore value store, said new semaphore value being indicative of exclusive access being granted to said exclusive access requestor; wherein (v) in response to execution of an exclusive access clear instruction by an exclusive access requestor, clearing logic is operable to clear stored semaphore identifying data for said exclusive access requestor.

The invention may also be embodied as a computer program product bearing a computer program for controlling a data processing apparatus in accordance with the above-described techniques.

The above, and other objects, features and advantages of this invention will be apparent from the following detailed description of illustrative embodiments which is to be read in connection with the accompanying drawings.

DETAILED DESCRIPTION

Figure 1:
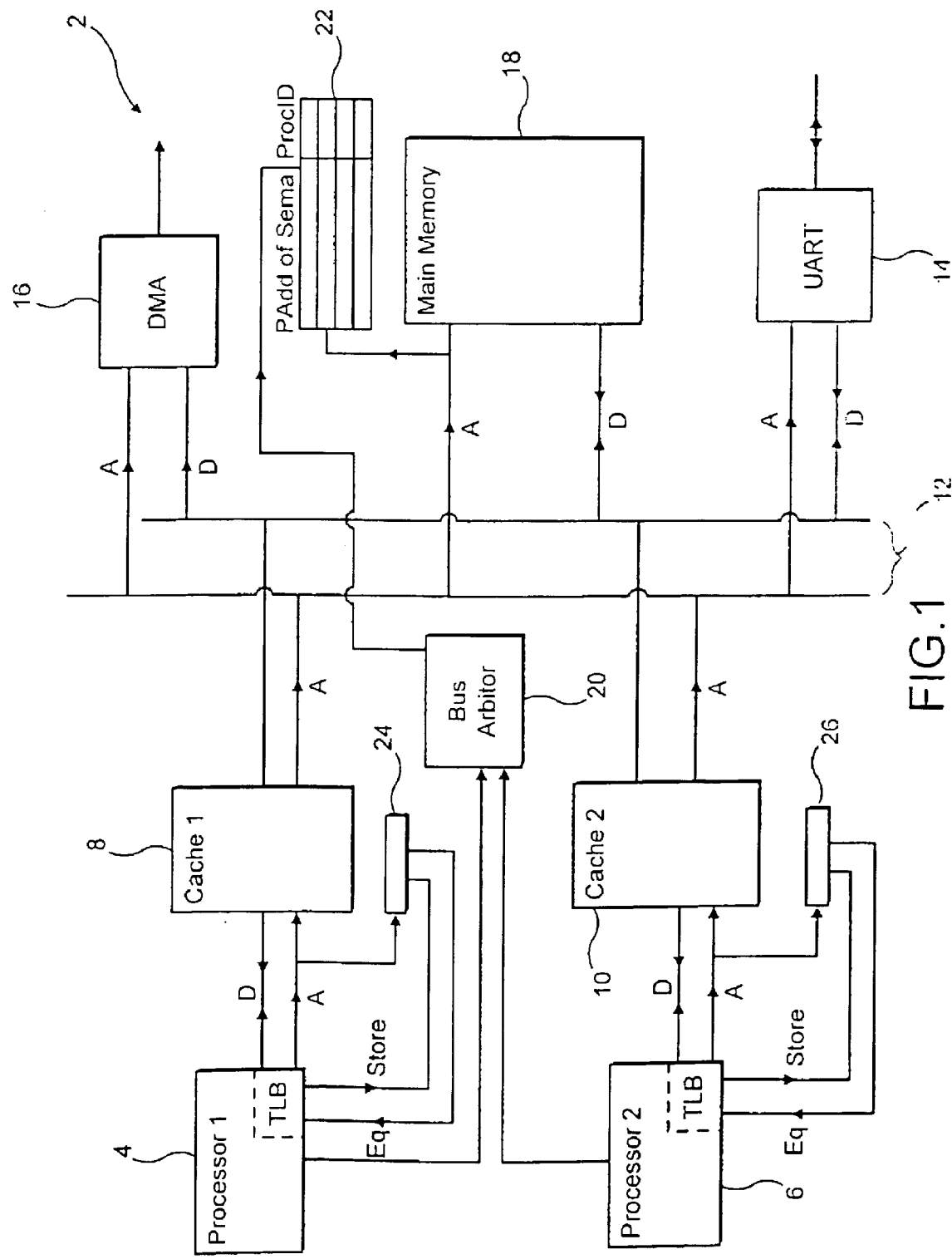
FIG. 1 schematically illustrates a multiprocessor system having a shared main memory to which exclusive memory access requests may be made.

FIG. 1 schematically illustrates a data processing system 2 including a first processor 4 and a second processor 6. A first cache memory 8 is associated with the first processor 4 and a second cache memory 10 is associated with the second processor 6. A shared address and data bus 12 connects the first processor 4 and the second processor 6 with other system elements including a UART circuit 14, a DMA circuit 16 and a shared main memory 18. A bus arbiter 20 serves to ensure that only one bus master may have control of the shared bus 12 at any given time.

The main memory 18 stores data elements, such as for example database records, to which it is required to allow exclusive access by one of the first processor 4 and the second processor 6. Semaphore values are stored within the main memory 18 for controlling the access to data elements, such as individual data records or areas of memory, for which exclusive access requests may be made. Monitoring circuitry 22 is provided local to the main memory 18 for storing data identifying which semaphore values have been retrieved by which processor 4 or 6. The semaphore identifying data takes the form of the physical memory address of the semaphore within the main memory together with processor identifying data, such as a processor number allocated by the bus arbiter 20. A semaphore identifying data store 24 is associated with the cache memory 8 and a further semaphore identifying data store 26 is associated with the cache memory 10. These semaphore data identifying stores 24, 26 are provided local to their respective processors 4, 6.

When a retrieve operation is performed for a semaphore value within the main memory 18, the physical address of that semaphore value is stored within the respective local semaphore identifying data store 24, 26. Only a single pending exclusive access establishing operation is allowed to exist for each processor 4, 6 at any given time. The two processors 4, 6, may each have their own pending exclusive access establishing request, but the software programmers of the data processing system 2 are constrained not to rely upon more than one pending exclusive access requesting operation within a given processor 4, 6.

The processors 4, 6 may operate using virtual addresses, but a translation to physical addresses using a translation lookaside buffer (TLB) occurs within each processor 4, 6 before the memory addresses are output to the respective cache memories 8, 10 and the main memory 18. Thus, the semaphore identifying data relates to physical addresses rather than virtual addresses in this embodiment.

Figure 2:
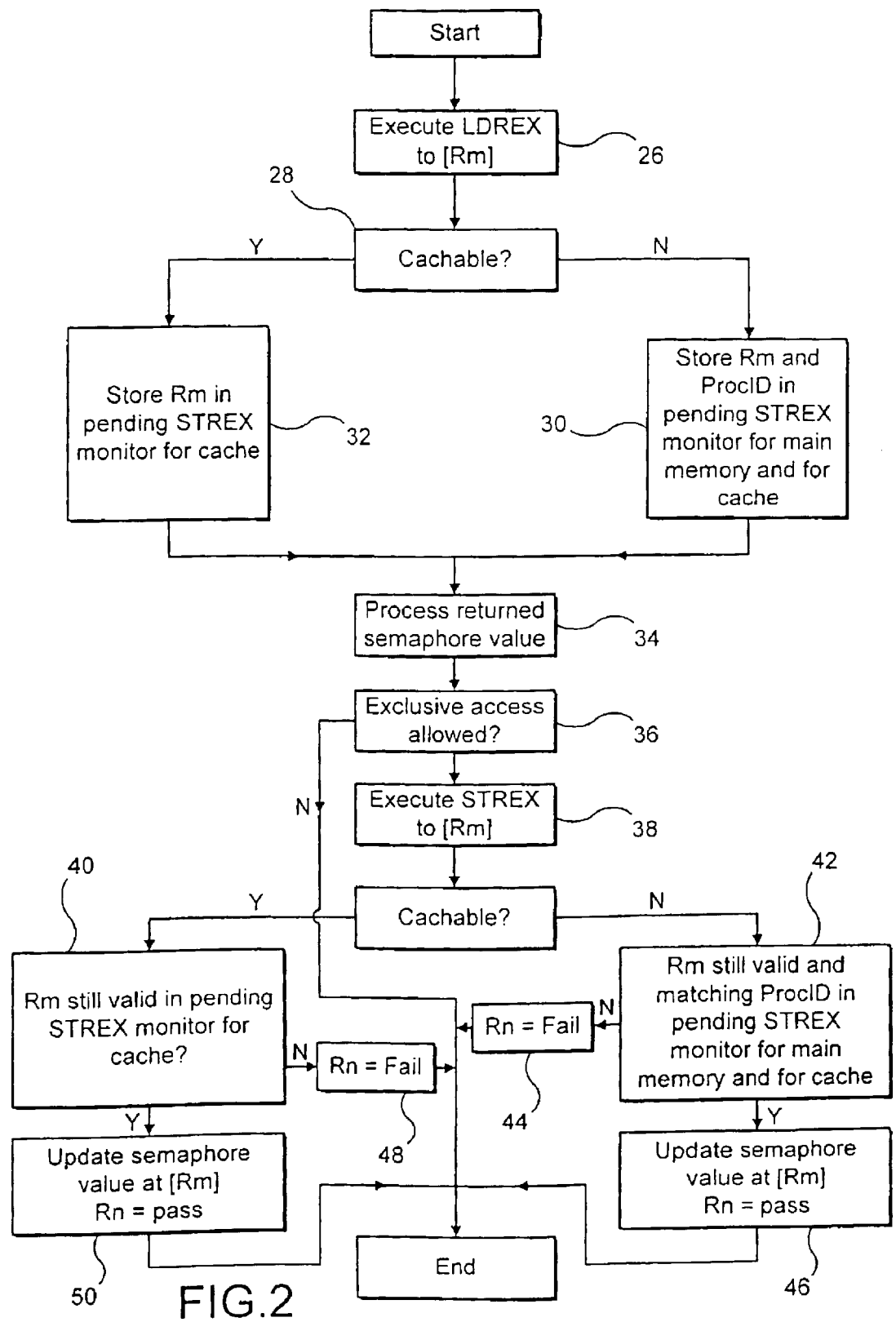
FIG. 2 is a flow diagram illustrating the normal operation of establishing an exclusive access permission within the system of FIG. 1.

FIG. 2 is a flow diagram schematically illustrating the operation of the system of FIG. 1. At step 26, one of the processors 4, 6 executes an LDREX instruction that loads a semaphore value from a memory location (specified within a register $R_m$) within the main memory 18. The LDREX instruction is different from a standard ARM LDR instruction that is used to load a memory value. The LDREX instruction utilises the mechanisms for establishing exclusive access relationships whereas the standard LDR instruction does not.

At step 28, a check is made as to whether or not the semaphore value being sought is cacheable. If the semaphore value is not cacheable, as indicated within an associated MMU (not illustrated), then processing proceeds to step 30. If the semaphore value is cacheable, then processing proceeds to step 32.

At step 30, the semaphore value corresponding to the address indicated by the $R_m$ register value is stored into a register $R_d$ specified within the LDREX instruction. Furthermore, the physical address of the semaphore value together with a processor identifying number for the processor executing the LDREX instruction is stored within the main memory monitor circuit 22. The bus arbiter 20 is triggered to provide this processor identifying number to the main memory monitor circuit 22 by the decoding of an LDREX instruction by one of the processors 4, 6. At step 30, the physical address of the semaphore data is also stored within the local semaphore identifying data store 24, 26 of the processor executing the LDREX instruction.

If processing from step 28 proceeds to step 32, instead of step 30, then no data is written into the main memory monitor circuit 22, but the physical address of the semaphore value being returned from address $R_m$ to register $R_d$ is written into the appropriate local semaphore identifying data store 24, 26.

At step 34, the semaphore value returned from the main memory 18 to one of the processors 4, 6 is examined to determine whether the retrieved semaphore value indicates that exclusive access to the associated data element is permitted. If exclusive access is not permitted, then processing terminates. Effectively, the exclusive access request attempt will be retried at some later time, possibly immediately using a tightly looped portion of code.

If the returned semaphore value indicates at step 36 that exclusive access is possible, then processing proceeds to step 38 at which an STREX instruction is executed. The STREX instruction seeks to store a new semaphore value into the main memory 18 indicating the exclusive access permission that has been granted. The STREX differs from a standard ARM STR instruction in that an additional check on the pending semaphore identifying data is made and a result value is returned indicating whether or not the write was completed.

If the write was not completed, then this is indicative of another processor or process having established an exclusive access permission to the same data element in the intervening time between reading the semaphore value at step 26 and attempting to execute a corresponding STREX instruction at step 38.

If the physical memory address of the semaphore value indicates that the semaphore value is cacheable then processing proceeds to step 40. If the semaphore value is non-cacheable, then processing proceeds to step 42.

Step 42 checks within the local semaphore identifying data store 24, 26 and the main memory monitor circuit 22 that the physical address of the semaphore value that is being written to is still stored (i.e. has not been cleared or overwritten), and in the case of the main memory monitor circuit 22 that the matching processor number is associated with the physical memory address. The check is first made with the local store 24, 26. If this has been cleared, then a fail result is returned, otherwise the main memory monitor circuit 22 is examined and the result returned from there. If both these conditions are not met, then processing proceeds to step 44 at which a fail result value is returned from the STREX instruction, the write not having taken place and processing terminates. The exclusive access request attempt may in practice be retried.

If the tests of step 42 indicated that the semaphore identifying data stored both locally to the processor 4, 6 and within the main memory monitor circuit 22 still match (i.e. there has been no intervening exclusive access permission granted to another process, an intervening clear instruction or some other interference with the normal exclusive access permission granting process), then processing proceeds to step 46 at which the semaphore value within the main memory is updated to indicate the granting of the exclusive access permission to the originator of the STREX instruction and a pass result value returned.

If the test as to whether or not the new semaphore value of the STREX instruction was cacheable indicated that it was cacheable, then step 40 checks within the local semaphore identifying data store 24, 26 that the matching physical address is still present. If the matching physical address is not still present, then processing proceeds to step 48 at which a fail result value is returned. If the matching result is still present, then processing proceeds to step 50 at which the semaphore value within the main memory is updated and a pass result value returned.

Figure 3:
FIG. 3 is an example of some ARM processor object code that may be used to establish an exclusive access permission.

FIG. 3 schematically illustrates an ARM object code routine for establishing an exclusive access permission. The LDREX instruction returns a semaphore value from the main memory 18 and sets up the appropriate semaphore identifying data. The CMP instruction determines whether or not the semaphore value indicates that exclusive access is possible. If exclusive access is not possible, then the BNE instruction returns processing to retry the request. If exclusive access is possible, then processing proceeds to further instructions, not illustrated, that set up the desired new semaphore value in register $R_d$. The instruction STREX serves to attempt to write the new semaphore value to the main memory 18. In accordance with the operation described in relation to FIG. 2, the STREX instruction will only properly complete if the semaphore identifying data in the appropriate stores matches indicating that no inappropriate intervening action has occurred that would interfere with a proper exclusive access relationship being established. The CMP instruction following the STREX instruction examines the result value returned from the STREX instruction to determine whether or not the new semaphore value was properly stored and accordingly that the exclusive access relationship was established. The BNE instruction again attempts to retry the process if the result value indicated a fail.

Figure 4:
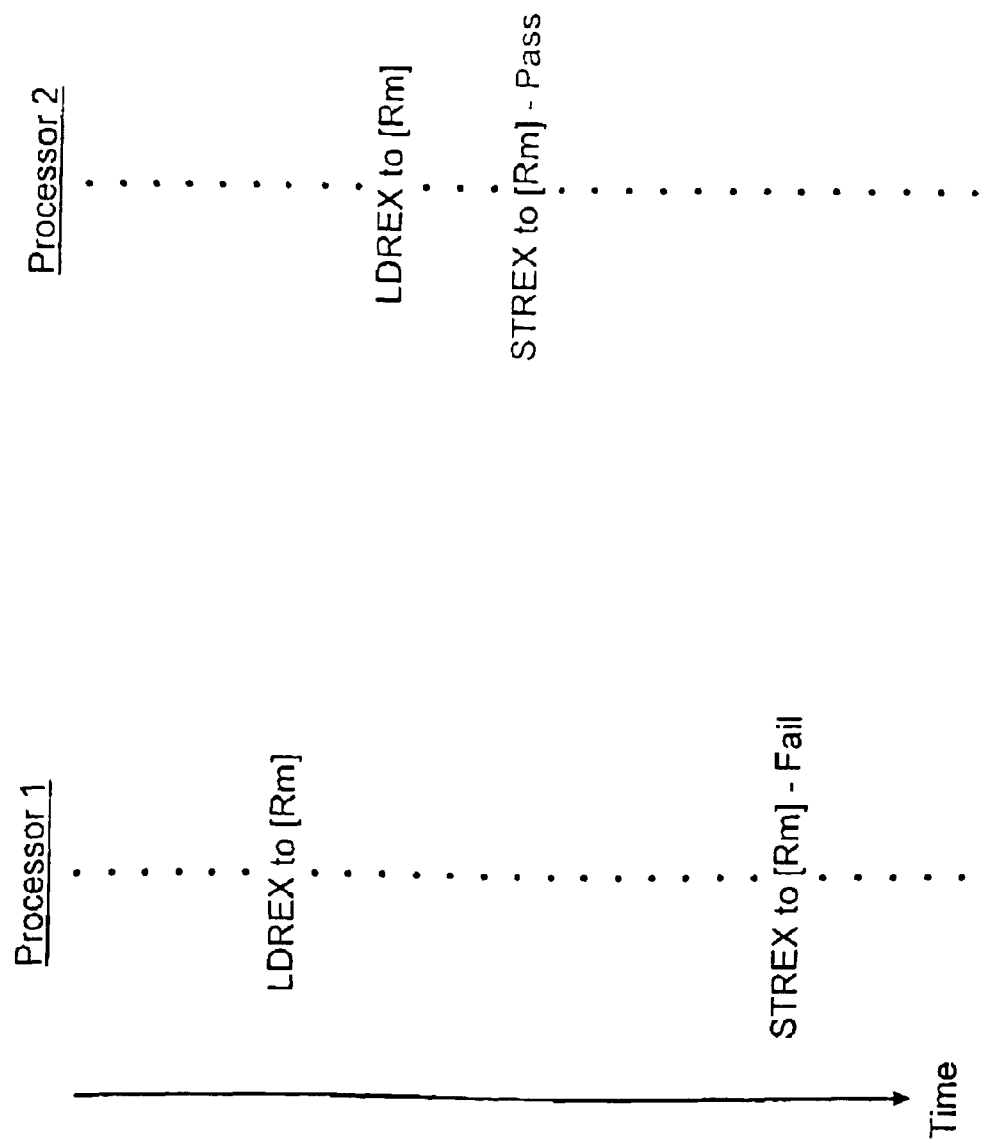
FIG. 4 illustrates a possible interaction between the two processors of FIG. 1 competing to obtain exclusive access to the same data element within the memory.

FIG. 4 schematically illustrates two processors that are competing to establish an exclusive access relationship to the same data elements. Processor 1 issues its LDREX instruction to read the semaphore first. This indicates that an exclusive access permission is possible. However, before Processor 1 can issue its STREX instruction to confirm that exclusive access relationship, Processor 2 both reads and writes the same semaphore value to establish an exclusive access relationship for Processor 2. Accordingly, when the STREX instruction for Processor 1 is attempted, this returns a fail value indicating that the exclusive access permission is not possible even though the semaphore value read by Processor 1 had indicated that this was a possibility.

Figure 5:
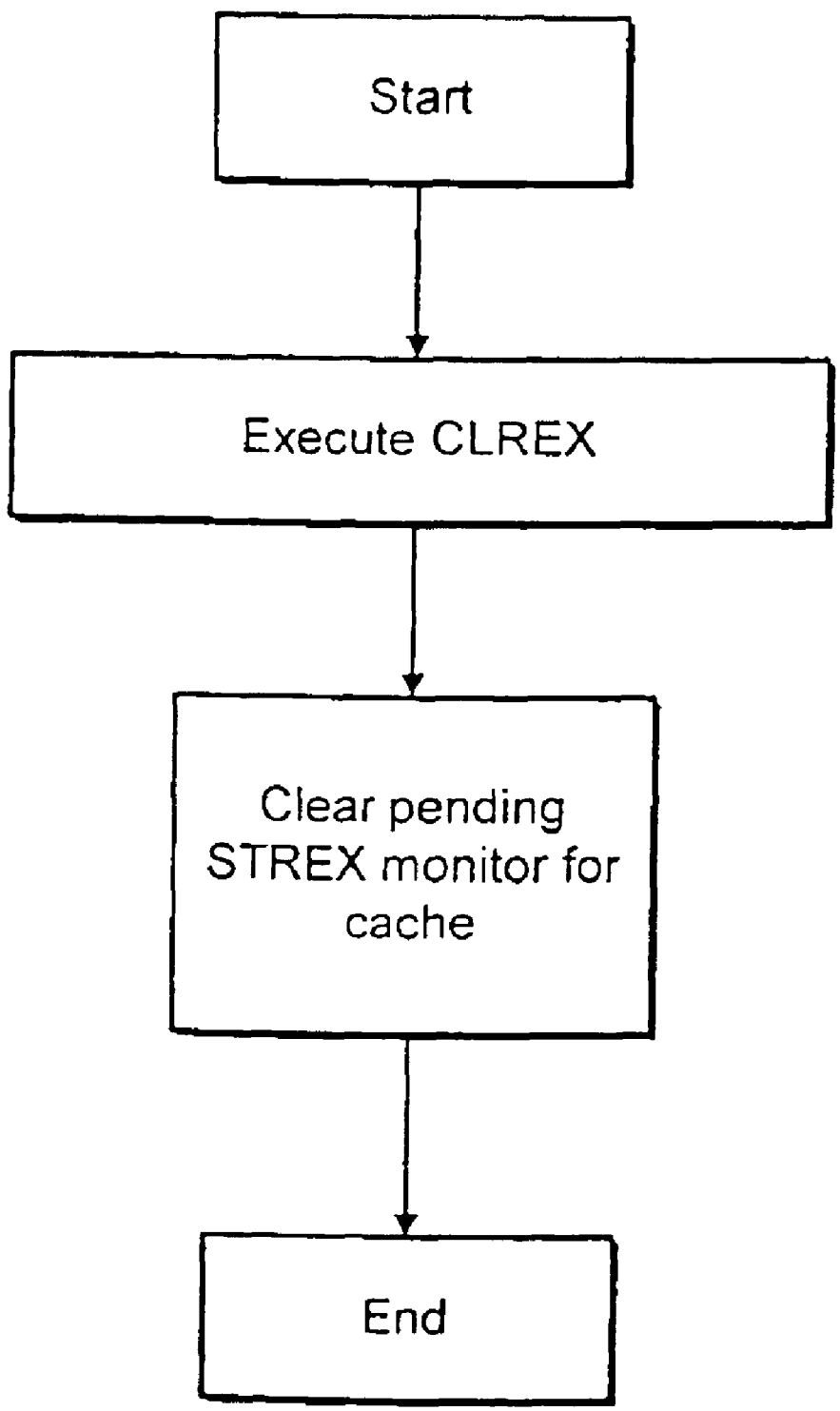
FIG. 5 is a flow diagram illustrating the action of an exclusive access clear instruction within the system of FIG. 1.

FIG. 5 schematically illustrates the operation of a CLREX instruction. This CLREX instruction is executed as an early step within any interrupt code or exception code as well as by context switching control software within a multitasking environment. The CLREX instruction serves to clear out any pending exclusive access permission requests that may be present for the processor executing the CLREX instruction. In practice, since the semaphore identifying data is stored within the local semaphore identifying data store 24, 26 of the processor 4, 6 irrespective of whether or not the semaphore value is cacheable, then clearing this local semaphore identifying data for the processor has the effect of stopping subsequent STREX instructions executing inappropriately for that semaphore value. In addition, providing this check, locally to the processor 4, 6 avoids the use of the shared system bus 12 thereby releasing this resource for use by other elements within the data processing system 2.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method of processing data, said method comprising the steps of:

(i) retrieving a semaphore value corresponding to a processing resource from a semaphore value store;

(ii) storing semaphore identifying data indicative of which semaphore value has been retrieved;

(iii) determining from said semaphore value whether or not said processing resource is available for exclusive access by a requesting exclusive access requestor; and (iv) writing a new semaphore value to said semaphore value store, said new semaphore value being indicative of exclusive access being granted to said exclusive access requestor, returning a result value indicative of whether or not said new semaphore value was written in said semaphore value store, and checking said semaphore identifying data to determine whether or not said semaphore identifying data has been cleared between said step of retrieving and said step of writing; and (v) in response to execution of an exclusive access clear instruction by an exclusive access requestor, clearing stored semaphore identifying data for said exclusive access requestor;

wherein if said semaphore identifying data has been cleared, then writing of said new semaphore value is not attempted.

2. A method as claimed in claim 1, wherein if a different exclusive access requestor has written a new semaphore value to said semaphore value store between said step of retrieving and said step of writing, then said result value indicates that said write of a new semaphore value by said exclusive access requestor has failed.

3. A method as claimed in claim 1, wherein a plurality of data processors share said processing resource.

4. A method as claimed claim 3, wherein said plurality of data processors share at least a common access point via which accesses to said processing resource are made.

5. A method as claimed in claim 1, wherein a local semaphore identifying data store is provided local to said exclusive access requestor.

6. A method as claimed in claim 4, wherein a write attempt does not reach said common access point if said semaphore identifying value stored in said local semaphore identifying data store has been cleared.

7. A method as claimed in claim 1, wherein a shared semaphore identifying data store is provided local to said processing resource.

8. A method as claimed in claim 1, wherein multitasking processing is performed such that different processing tasks may act as different exclusive access requestors.

9. A method as claimed in claim 7, wherein said exclusive access clear instruction clears said local semaphore identifying data store, but not said shared semaphore identifying data store, and said semaphore identifying data within said local semaphore identifying data store is checked to determine whether or not said semaphore identifying data has been cleared between said step of retrieving and said step of writing.

10. A method as claimed in claim 1, wherein said processing resource is a data element stored within a data memory.

11. A method as claimed in claim 1, wherein an exclusive access clear instruction is executed upon occurrence of one or more of:

(i) an exception triggering exception handling; and (ii) a context switch between different tasks within multitasking operation.

12. A method as claimed in claim 1, wherein said semaphore identifying data is data indicative of a memory address associated with said processing resource.

13. A method as claimed in claim 3, wherein said shared semaphore identifying data store stores data indicative of which processor is requesting exclusive access to said processing resource.

14. A computer program product including a computer program for controlling a data processing apparatus in accordance with the method of claim 1.

15. Apparatus for processing data comprising:

(i) retrieving logic operable to retrieve a semaphore value corresponding to a processing resource from a semaphore value store;

(ii) storing logic operable to store semaphore identifying data indicative of which semaphore value has been retrieved;

(iii) determining logic operable to determine from said semaphore value whether or not said processing resource is available for exclusive access by a requesting exclusive access requestor; and (iv) writing logic operable to write a new semaphore value to said semaphore value store, said new semaphore value being indicative of exclusive access being granted to said exclusive access requestor, to return a result value indicative of whether or not said new semaphore value was written in said semaphore value store and to check said semaphore identifying data to determine whether or not said semaphore identifying data has been cleared between said retrieval by said retrieving logic and said writing of said new semaphore value; and (v) in response to execution of an exclusive access clear instruction by a exclusive access requestor, clearing logic is operable to clear stored semaphore identifying data for said exclusive access requestor;

wherein if said clearing logic has cleared said stored semaphore identifying data, said writing logic does not attempt to write said new semaphore value.

* * * * *